T. G. DEWEESE.
SHIFTING MECHANISM FOR GEARING AND CLUTCH.
APPLICATION FILED MAY 7, 1917.

1,284,067.

Patented Nov. 5, 1918.
3 SHEETS—SHEET 1.

WITNESS:
H L Israel
E A Speir

INVENTOR.
Thomas G. Deweese
BY
William C. Edwards Jr.
ATTORNEY.

T. G. DEWEESE.
SHIFTING MECHANISM FOR GEARING AND CLUTCH.
APPLICATION FILED MAY 7, 1917.
1,284,067.
Patented Nov. 5, 1918.
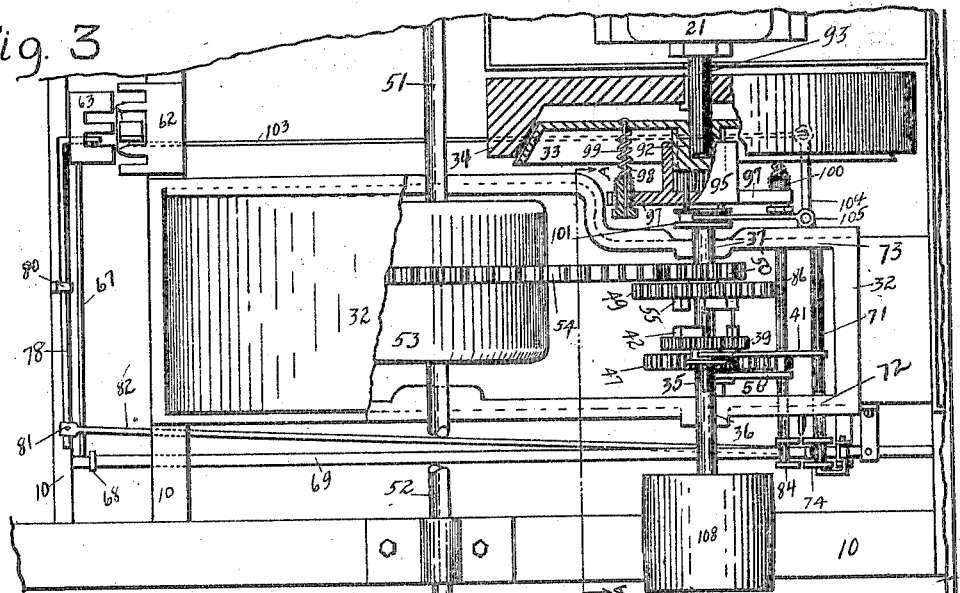
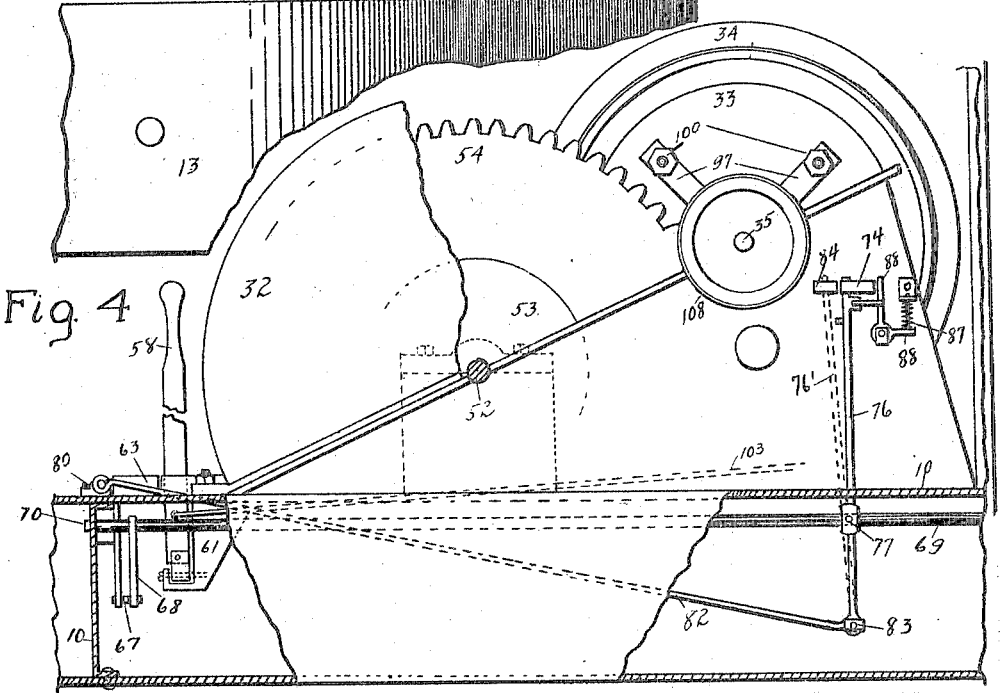

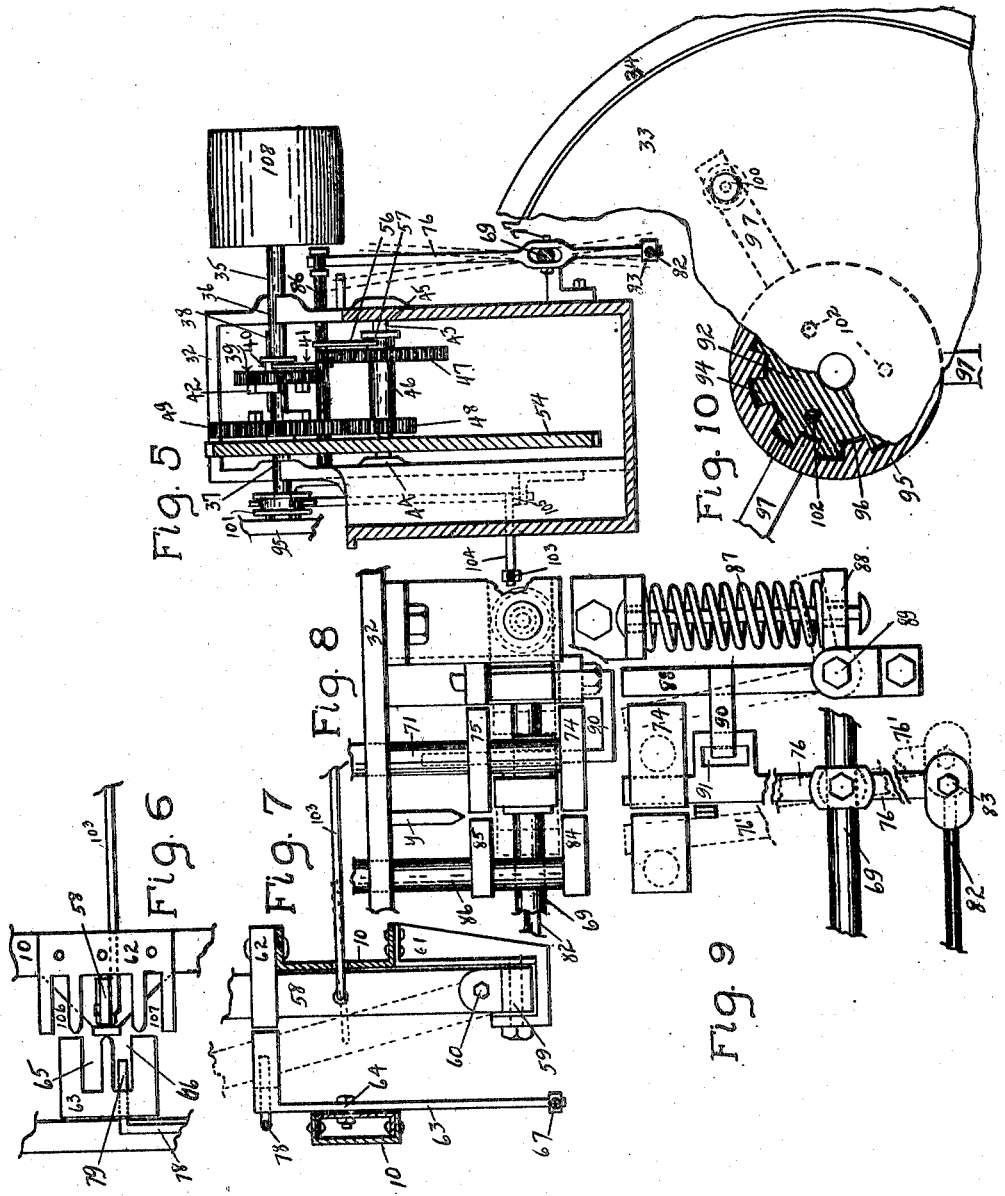

UNITED STATES PATENT OFFICE.

THOMAS G. DEWEESE, OF WICHITA, KANSAS, ASSIGNOR OF ONE-HALF TO M. M. MAY AND R. E. MAY, BOTH OF WICHITA, KANSAS.

SHIFTING MECHANISM FOR GEARING AND CLUTCH.

1,284,067.

Specification of Letters Patent.

Patented Nov. 5, 1918.

Application filed May 7, 1917. Serial No. 167,108.

*To all whom it may concern:*

Be it known that I, THOMAS G. DEWEESE, a resident of Wichita, in the county of Sedgwick and State of Kansas, have invented certain new and useful Improvements in Shifting Mechanism for Gearing and Clutch, of which the following is a description, referring to the accompanying drawings, which form a part of this specification.

The invention relates to an improvement in clutch mechanism, sliding gear transmission and shifting mechanism connected therewith whereby the clutch is released before a gear of the transmission mechanism is shifted; the invention is especially adapted to uses in tractor construction of the improved design illustrated in the accompanying drawings whereby power is directly transmitted through the differential to the driving wheels of the tractor.

Figure 1:
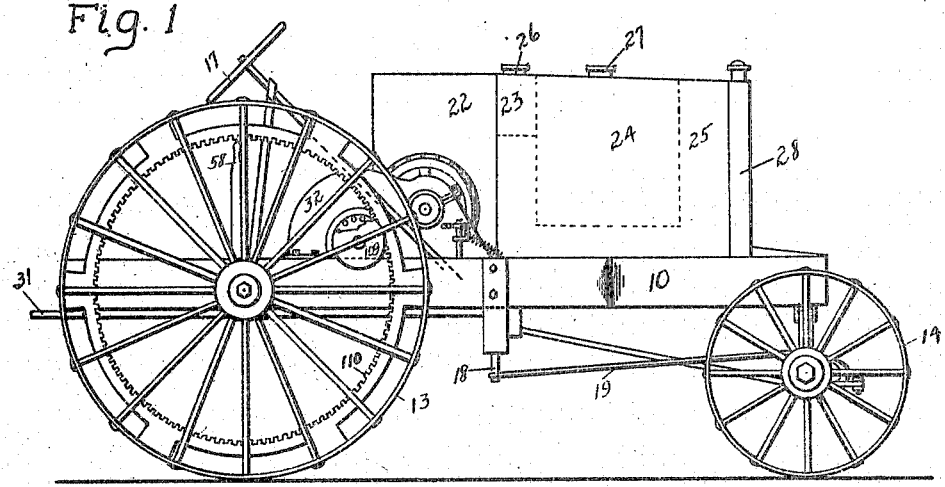
Figure 2:
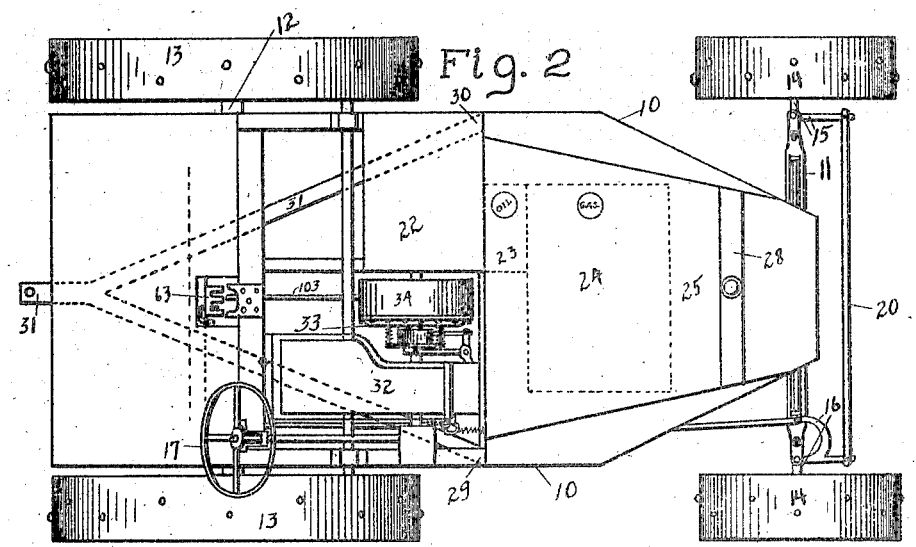

In the drawings, Figure 1. represents a side view of the tractor. Fig. 2 is a plan view of the tractor seen in Fig. 1. Fig. 3. is an enlarged plan view of portions of the power transmitting mechanism with parts removed for convenience of illustration. Fig. 4 is a side view of Fig. 3. Fig. 5 is a sectional view taken along the line A—A Fig. 3 looking in the direction of the arrows. Fig. 6 is a detail of the guides for the shifting lever. Fig. 7 is a side view of the parts seen in Fig. 6. Fig. 8 is an enlarged view of the gear shifting device seen in Fig. 3. Fig. 9 is a side view of Fig. 8. Fig. 10 is a sectional view of the clutch mechanism.

Similar numerals of reference indicate corresponding parts in all the figures of the drawings. Referring to the drawings; in Fig. 1 is seen my improved tractor, which is constructed primarily somewhat similar to the standard automobile, 10 representing the frame mounted over front and rear axles 11 and 12. Rear driving wheels 13, 13 rotate on axle 12, while front wheels 14, 14 are rotatably mounted on the spindles 15, 16 attached to the axle 11, and the direction of travel of the tractor is governed by means of the steering wheel 17 acting as in the ordinary automobile through gearing upon the arm 18 and rod 19 and wheel bearings 15, 16 connected by the rod 20.

The engine or motor 21 supported by parts of the frame 10 is covered by the hood 22, the oil tank 23 and gasolene tank 24 indicated by dotted lines under a hood 25 are filled through the caps 26 and 27 respectively. At 28 is seen the radiator.

To the frame 10 is attached a Y-shaped drawbar 31 at 29 and 30, by this means the load is drawn from the center of the machine.

In Figs. 1 and 2 at 32 is shown the transmission case, the contained transmission being more fully disclosed in Figs. 3, 4 and 5. At 33 is shown a cone clutch for engaging the flywheel 34 of the engine 21 for power transmission. At 35 is seen a shaft housed in bearings 36, 37 in the transmission case 32, said shaft 35 being provided with a keyway 38 on which is slidably mounted the gear 39 which has a grooved hub 40 adapted to engage an arm 41, which arm by further described means controls the position of the gear 39 on the key way 38 and shaft 35. The gear 39 is also provided with a block clutch 42. Rotatably and slidably mounted on a second shaft 43 housed at 44 and 45 in the case 32 is a sleeve 46 intermediate and integral with a gear 47 and gear 48. At 49 is seen a gear rotatably mounted on shaft 35 and attached to gear 49 is a smaller gear 50. Mounted between the two driving shafts 51 and 52 is the differential 53 and attached to the differential 53 is the large driving gear 54 which is in mesh with gear 50. In Fig. 5, gear 39 stands in neutral and gear 48 is in mesh with gear 49. Moving the arm 41 to the right slides the gear 39 in mesh with 47, this being shift for low gear drive. To shift the transmission into high gear the arm 41 is moved to the left, the blocks 42 on 39 engaging similar blocks 55 integral with gear 49. For reverse gear drive, the gear 39 stands in neutral as in Fig. 5; an arm 56 engages a grooved hub 57 on gear 47, moving said arm 56 to the left by means later described will bring the gear 47 in mesh with the gear 39 and the gear 48 in mesh with the driving gear 54 thus accomplishing the desired reverse gear.

The gear shift is effected by the shifting lever 58 which is pivotally mounted at 59 and 60 to a hanger 61 attached to a portion of the frame 10. As seen in Figs. 6 and 7 lever 58 stands in neutral within the toothed plate 62 bolted to frame bar 10. The selective lever 63 is of L-shape and is pivotally attached at 64 to a cross bar of frame 10. The lever 63 has two notches 65 and 66 formed therein and at its lower end at 67 is a rod connecting to a crank 68 rigidly attached to a rod 69. This rod 69 is housed in front and rear bearings as at 70 in cross bars of the frame 10. If the lever 58 be drawn back into notch 65 of lever 63 and then the lever 58 be moved to right or left, the lever 63 will pivot on 64 whereby the rod 67 and crank 68 will cause rotary motion to the rod 69. This rotary motion of 69 accomplishes the desired gear shift as will now be described. The shaft 71 slidably housed at 72; 73 in the case 32 is rigidly attached to the shifting arm 41 engaging the hub 40 of gear 39, an end block 74 forms a T head on shaft 71 and farther back on said shaft 71 at 75 is a second block. The rod 69 passes through and is swiveled to a bar 76 at 77, the upper end of bar 76 is adapted to play between the blocks 74 and 75 on shaft 71 whereby rotary movement of the rod 69 previously explained will cause the bar 76 to move the block 75 to the left of the block 74 to the right as indicated by the dotted position seen in Fig. 5, thereby shifting the gear 39 on the keyway 38 in the direction desired to accomplish desired gear shift for forward speeds. For reverse gear, the lever 58 is drawn to the right and back into notch 66 of lever 63 where 58 comes into contact with a rod 78 which has a right angle bend projecting through 63 into 66 as shown at 79. The rod 78 is adapted to slide in and pivot in a bearing at 80 on the frame 10. To the end of rod 78 at 81 is pivotally attached the rod 82 which is pivotally attached to the lower end of bar 76 at 83.

Thus by drawing the shift lever 58 backward into 66, it will force rod 78 to pivot at 80 causing 82 to travel forward causing bar 76 to move backward as shown to the dotted position 76' Figs. 8 and 9 between the two blocks 84 and 85 on the shaft 86 which carries the attached shifting arm 56. Movement of the lever 58 to the left in 66 will now cause the bar 76 to drive the block 85 to the left to cause the arm 56 to move the gear 47 in mesh with 39 as previously described for reverse gear operation.

It being desired to hold a tension on the bar 76, I have provided a spring 87 properly mounted on parts on the frame 10 as seen in Figs. 8 and 9. At 88 is an L-shaped crank, hinged at 89 to the frame 10 and against which the spring 87 bears. Integral with 88 is a right angle offset bar 90 which passes through an eye 91 in bar 76 whereby the spring 87 exerts tension on 76 whether standing between the blocks 74 and 75 or as at 76' and shifted to the left for reverse gear, when the pin Y attached to frame bar 10 resists such spring action.

Referring to Figs. 3, 4 and 5 and 10, the cone clutch 33 has its hub 92 housed on the engine shaft 93. The hub 92 is provided with teeth 94. Rigidly attached to the shaft 35 is a hub 95 provided with teeth 96 meshing with teeth 94 on hub 92 of 33. Attached to the hub 95 are three arms 97 carrying springs 98, spring guides 99 and tension screws 100. Slidably mounted upon the shaft 35 is a grooved collar 101 having three pins 102 rigidly connecting to the hub 92 of the clutch 33. When transmission is to be thrown into gear, a rod 103 connected with the shifting lever 58 operates to release the clutch 33. This rod is connected to an L-shaped crank 104 hinged at 105 to the frame. Rearward movement of 58 thus forces the inner end of crank 104 engaging the collar 101 to draw said collar to the right, compressing the springs 98 and releasing the clutch 33, the teeth 94 sliding upon teeth 96 as will be seen. When desired shift of lever 63 has been accomplished, the springs 98 then act to engage the clutch 33 with the flywheel 34 and the lever 58 drops into a notch as at 106 or 107 of the plate 62. It will be seen that by this arrangement it is impossible to shift gears without disengaging the clutch thus liability of stripped gears is obviated.

At 108 on shaft 35 is seen a pulley wheel. Gears 109 attached to the driving shafts 51 and 52 mesh with gearing 110 on the rear driving wheels 13 whereby the tractor is propelled.

Such modifications may be employed as lie within the scope of the appended claims.

Having fully described my invention what I now claim as new and desire to secure by Letters Patent is:

1. In a tractor, the combination of clutch mechanism including clutch members, spring means tending normally to maintain the clutch members in engagement, and means to disengage the clutch members; a transmission mechanism including shiftable gears, rods associated with some of said gears for shifting them, and a pair of blocks carried by each of said rods; and shifting mechanism for the clutch mechanism and the transmission mechanism including a shifting lever oscillatable in two planes, means connecting the shifting lever and the clutch disengaging means, an oscillatably mounted rod, means for oscillating the rod including a member having two shift lever engaging notches, a selective lever pivoted to and oscillatable with said oscillating rod and having its upper end adapted to engage between blocks of either of said gear shift rods, means tending to normally maintain the upper end of said selective lever in engagement between the blocks of one of said rods, and means associated with the lower end of the selective lever and having a portion projecting within one of the notches whereby when the shift lever is engaged in said notch the means is operated to move the selective lever into engagement between the blocks of the other gear shift rod, movement of the shift lever in one plane to engage the notches serving through the disengaging means to disengage the clutch and movement in the other plane after engagement with a notch serving to move a shift rod.

2. In a tractor, the combination of clutch mechanism; gearing; and shifting means for the clutch mechanism and gearing; said shifting means including a shift lever, disengaging means for the clutch connected with said lever, gear shifting means adapted to be engaged by the shift lever after the clutch is disengaged, including a plurality of gear shift rods, a member engageable with either of said rods, means to move the member to shift the engaged rod said means having a plurality of shift lever engaging portions, spring means effective to move the member into engagement with one of the rods and means connected with the member and projecting within one of the shift lever portions whereby when the shift lever is engaged in said portion said means is effective against the spring means to move the member into engagement with the other shift rod.

THOMAS G. DEWEESE.

Witnesses:
P. C. SAWYER,
U. G. CHARLES.

Copies of this patent may be obtained for five cents each, by addressing the "Commissioner of Patents, Washington, D. C."